United States Patent [19]
Yamashita et al.

[11] Patent Number: 5,237,625
[45] Date of Patent: Aug. 17, 1993

[54] IMAGE CONTOUR ENHANCING DEVICE

[75] Inventors: Haruo Yamashita, Osaka; Hideshi Ishihara, Takatsuki; Yasuki Matsumoto, Hirakata, all of Japan

[73] Assignee: Matsushita Electric Industrial Co., Ltd., Osaka, Japan

[21] Appl. No.: 978,459

[22] Filed: Nov. 19, 1992

Related U.S. Application Data

[63] Continuation of Ser. No. 690,694, Apr. 24, 1991, abandoned.

[30] Foreign Application Priority Data

Apr. 24, 1990 [JP] Japan .................. 2-109354

[51] Int. Cl.⁵ .................. G06K 9/36; H04N 5/208
[52] U.S. Cl. .................. 382/22; 358/37; 358/166; 382/54
[58] Field of Search .................. 382/22, 54, 43; 307/555, 556, 263; 358/37, 166

[56] References Cited

U.S. PATENT DOCUMENTS

| | | | |
|---|---|---|---|
| 4,581,631 | 4/1986 | Sonnenberger | 358/37 |
| 4,618,990 | 10/1986 | Sieb, Jr. et al. | 382/43 |
| 4,646,152 | 2/1987 | Eichelberger et al. | 358/166 |
| 4,888,641 | 12/1989 | Isnardi et al. | 358/12 |
| 4,980,755 | 1/1990 | Ozaki | 358/37 |

FOREIGN PATENT DOCUMENTS

| | | | |
|---|---|---|---|
| 0066321 | 6/1977 | Japan | 358/166 |
| 0183987 | 7/1989 | Japan | 358/37 |
| 2144302 | 2/1985 | United Kingdom | 358/37 |

Primary Examiner—Leo H. Boudreau
Attorney, Agent, or Firm—Wenderoth, Lind & Ponack

[57] ABSTRACT

An image contour enhancing device for enhancing contours in images in an image data formed by a plurality of pixel data includes differentiation circuits for differentiating the image data to produce first and second order differentiation signals. The first order differentiation signal represents an image data portion corresponding to front and rear edges of the contour, and the second order differentiation signal represents first and second half portions in each of the front and rear edges of the contour. The second order differentiation is used for a time modulation signal applied to a time modulation circuit to modulate in the time domain the image data in response to the time modulation signal such that the first half portion in the front and rear edges of the contour is delayed, and the second half portion in the front and rear edges of the contour is advanced.

4 Claims, 8 Drawing Sheets

IMAGE CONTOUR ENHANCING DEVICE

This application is a continuation of now abandoned application, Ser. No. 07/690,694, filed on Apr. 24, 1991.

BACKGROUND OF THE INVENTION

1. Field of the Invention

The present invention generally relates to an image signal processing device, and more particularly, to an image contour enhancing device which is capable of improving the resolution at the image contour by processing the color difference signals of signals such as that of an NTSC system and input image signals of video printers.

2. Description of the Prior Art

Recently, accompanying the development of a hard copy technique, particularly a full color hard copy technique, it has become possible to reproduce a high fidelity image by using a copy-printing technique such as a sublime type thermal copying technique. In respect of the color reproduction, a reproducing ability equivalent to the silver print has been reached by dint of a recording material and the image processing. In respect of the resolution, the level of the silver print is being approached by using a highly minute image signal such as a high-vision signal.

However, in a video printer for recording TV signals of the current system, even if the resolution of the printer is high, the resolution thereof is restricted by the band restriction of the image signal in an NTSC system, etc., and therefore in the present circumstance, a resolution sufficient for the recording image can not be obtained. Particularly, in the color difference signal of the image signal, since the bandwidth thereof is considerably limited as compared with the brightness signal, the horizontal resolution is extremely low such as several tens of lines, there has been such a problem that color blurring is caused in the record image.

Conventionally, the apparent resolution of the image has been improved by way of, for example, (1) a method of raising the gain of the high band frequency, or (2) a method of emphasizing the contour by taking a Laplacian of the second order differentiation.

Method (1) of raising the gain of the high band frequency is literally a method of raising the gain of the high band part as compared with the low band part so as to emphasize the image of the high band part.

Method (2) of emphasizing the contour will be described with reference to FIG. 8.

Figure 8:
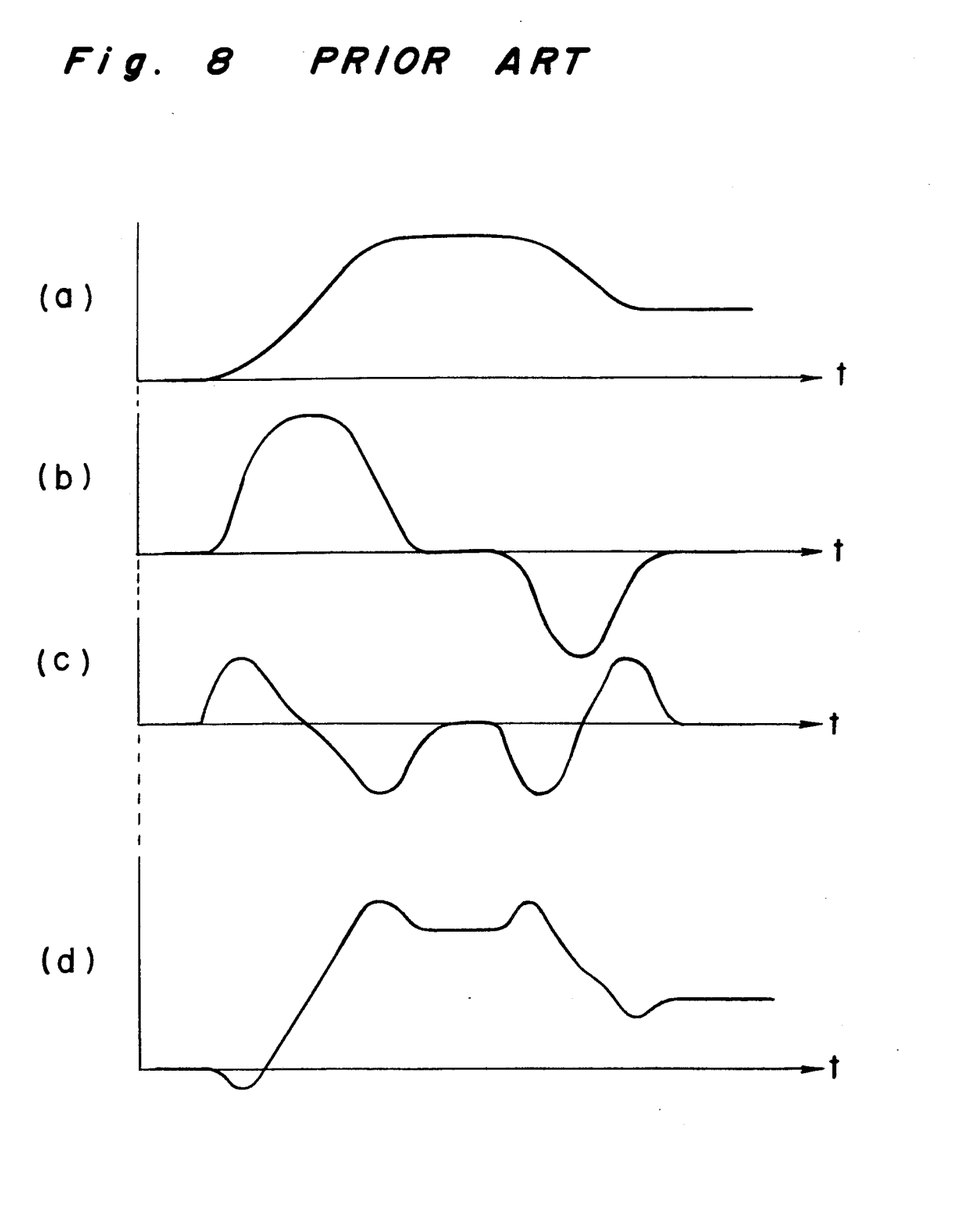
FIG. 8 is a waveform diagram for explaining the operation of the conventional device.

In FIG. 8, curve (a) shows a waveform of an input image signal, curve (b) shows a differential waveform representing the contour of the image by differentiating the curve (a), and the curve (c) is a second order differential waveform obtained by further differentiating the curve (b). The second order differential waveform formed in this manner corresponds to higher harmonic components extracted from the input signal (a). The curve (d) was obtained by reversing the second order differential waveform (c) after a suitable amplification and adding the result to the input image signal (a). The obtained contour-enhanced image signal (d) accompanies preshoots and overshoots at the rising and falling portions which eventually result in enhancing the contour of the image signal, thus improving the apparent resolution.

In the picture image devices such as a television and VCR, the above-mentioned contour enhancing method is arranged to make a second order differential waveform by a delay line or an LC circuit thereby enhancing the contour by an analog circuit. Meanwhile in the digital image processing devices, the method is arranged to obtain the second order differential waveform by the use of a Laplacian operator, etc., as a spacial filter so as to effect the contour enhancing processing. The adding of preshoots and overshoots to the contour of the image signal results in increasing of the amplification of the high frequency component.

Such a contour enhancing method is similar to the unsharp masking conventionally used for a long time in the image reading devices.

However, method (1) has a problem that the S/N ratio is deteriorated because the high band noise component is amplified.

Also, method (2) also results in a problem of deterioration of S/N ratio because the noise signal in the high frequency region is amplified as in method (1).

In addition, although the preshoot and overshoot of the contour part added in the conventional contour enhancing method has an effect of providing accents to the contour so as to improve the resolution using the luminance signal, the preshoots and overshoots adversely affects when the conventional contour enhancing method (2) is used with color data. This is because the added preshoots and overshoots change the hue and tint, resulting in unnatural changes in the color at the contour. For example, by the preshoots and overshoots, a contour changing from red to yellow would results in an unnatural contour changing from red, purple, yellowish green, and yellow, resulting in such a problem that the contour enhancing does not improve the resolution.

Furthermore, in the case of applying the conventional contour enhancing to the contour enhancing of the input signal of an image printer, since the highlight and shade width of the printer is restricted by the color of the recording paper and the maximum recording tint and shade of the printer, the dynamic range thereof is narrower as compared with that of CRT and the like, the preshoot and overshoot are consequently cut off, resulting in a problem that the contour enhancing does not nearly become effective.

SUMMARY OF THE INVENTION

In view of these problems, an essential object of the present invention is to provide an image processing device which is free from the deterioration of S/N ratio and unnatural hue changes in a color signal, and is capable of effecting an effective resolution improvement within the printing dynamic range in the application to printers.

In order to accomplish the above-described object, according to the present invention, an image contour enhancing device for enhancing contours in images in an image data formed by a plurality of pixel data, according to a first embodiment comprises: a time domain compression means for compressing in the time domain the image data at the contours therein; and a time domain expansion means for expanding in the time domain the image data at portions adjacent the contours so as to counterbalance the effects of the compression An image contour enhancing device for enhancing contours in images in an image data formed by a plurality of pixel data according to an embodiment of the present invention comprises: a contour information extraction means for extracting contour information from said image data; a modulation signal producing means for producing a modulation signal representing first and second half portions in each of front and rear edges of the contour; a time modulation means for modulating in time domain said image data in response to said time modulation signal such that the first half portion in said front and rear edges of said contour is delayed by a greater amount, and the second half portion in said front and rear edges of said contour is delayed by a lesser amount.

Furthermore, according to a second embodiment of the present invention, the image contour enhancing device comprises: a first differentiation means for differentiating the image data to produces a first differentiation signal representing an image data portion corresponding to a contour; an absolute value means for taking an absolute value of the first differentiation signal to produce an absolute value signal representing front and rear edges of the contour; a second differentiation means for differentiating the absolute value signal to produce a time modulation signal representing first and second half portions in each of the front and rear edges of the contour; and a time modulation means for modulating in time domain the image data in response to the time modulation signal such that the first half portion in the front and rear edges of the contour is delayed, and the second half portion in the front and rear edges of the contour is advanced.

Yet furthermore, according to a third embodiment of the present invention, the image contour enhancing device comprises: a first differentiation means for differentiating the image data to produces a first differentiation signal representing an image data portion corresponding to a contour; a first comparing means for detecting the polarity of the first differentiation signal; a second differentiation means for differentiating the first differentiation signal to detect, with the use of detection result of the first comparing means, a time modulation signal representing first and second half portions in each of the front and rear edges of the contour; a second comparison means for comparing the output of the second differentiation means with a positive threshold and a negative threshold; a delay means for delaying the input signal in a plurality of stages for delaying the image data serially in a plurality of stages and for producing a plurality of delayed outputs and a non-delayed output; and a selection means for receiving outputs from the delay circuits and for selecting one output in accordance with the outputs from the first and second comparison means.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
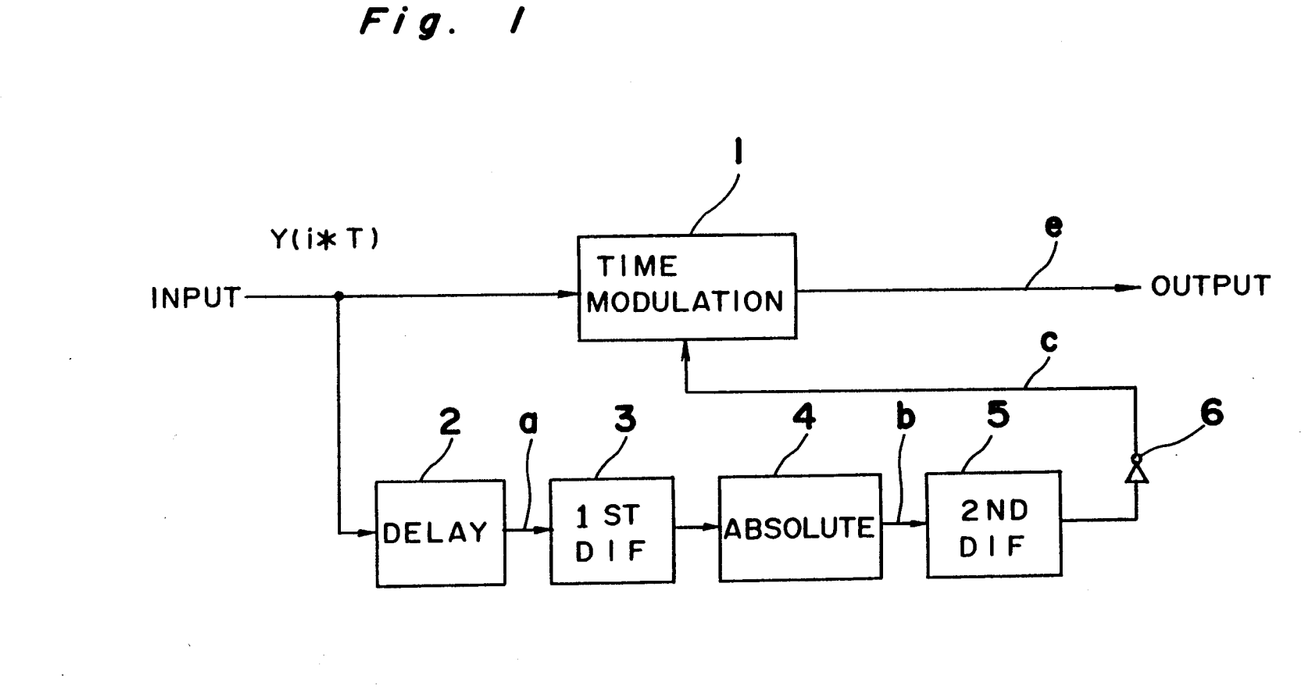
FIG. 1 is a block diagram of an image signal processing device according to a preferred embodiment of the present invention.

Referring to FIG. 1, a block diagram of an image contour enhancing device is shown which is for enhancing the contour of an image by decreasing the color blurring accomplished for example by improving the resolution of the color difference signal. The input signal $Y(i*T)$ thereto is, for example, a digital color difference signal obtained by demodulating an image signal of an NTSC system or the like into a brightness signal and a color difference signal. The digital color difference signal is samples by a clock signal synchronized with the sub-carrier.

Figure 3:
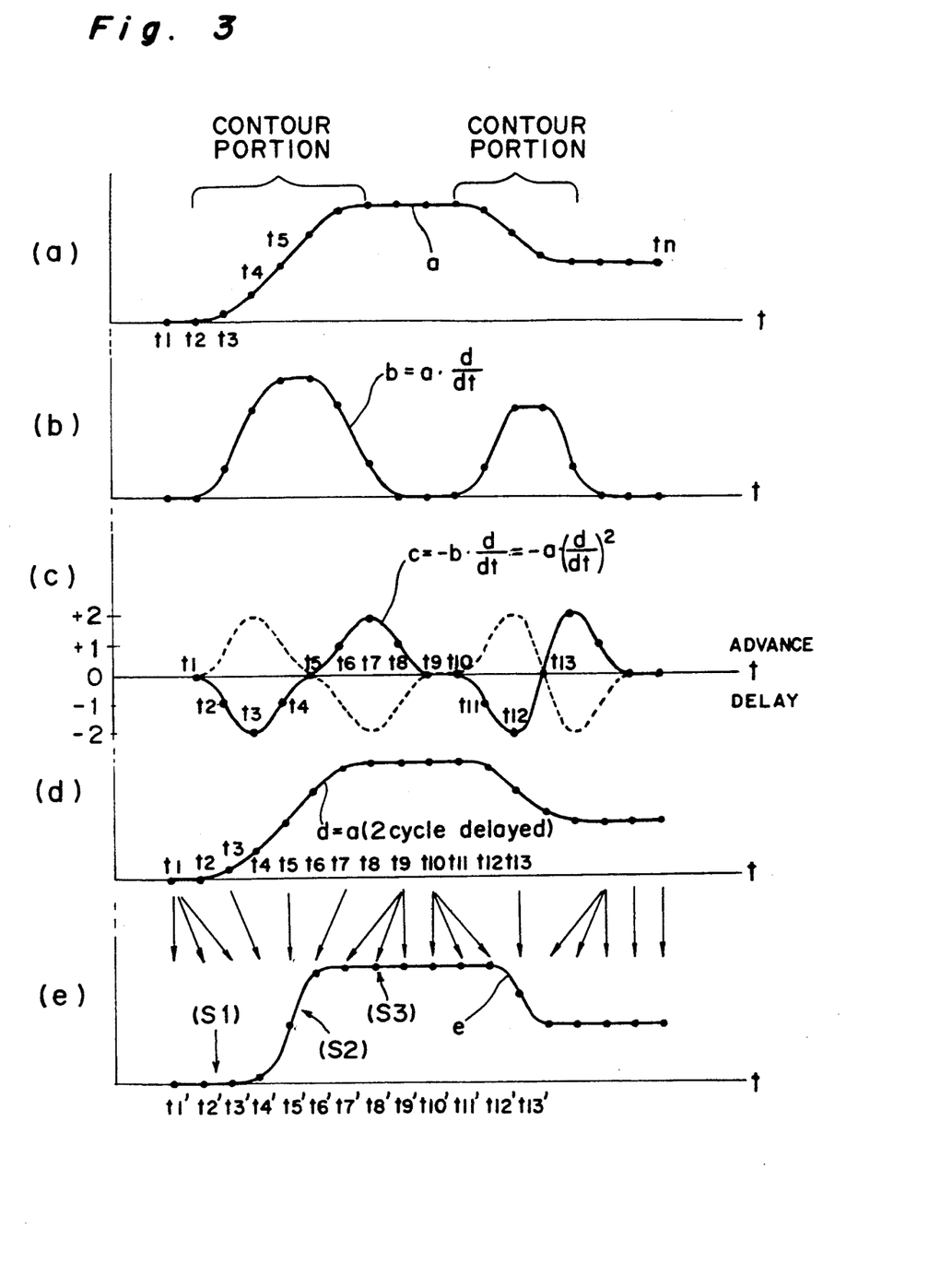
FIG. 3 is a waveform chart for explaining the operation.

The image contour enhancing circuit shown in FIG. 1 includes a time modulation circuit 1 which receives an input signal $Y(i*T)$, a delay circuit 2 which produces a two-sampling cycle delayed signal as shown in FIG. 3 to effect the same amount of delay as that effected in the time modulation circuit 1, a first differentiation circuit 3 for differentiating the signal a, an absolute value calculation circuit 4 for taking an absolute value of a(d/dt) to produce an absolute value first order differentiated signal d shown in FIG. 3, and a second differentiation circuit 5 for differentiating the signal b to produce a second order differentiated signal and an invertor 6 for inverting the second order differentiated signal to produce a time modulation signal c as shown in FIG. 3.

Figure 2:
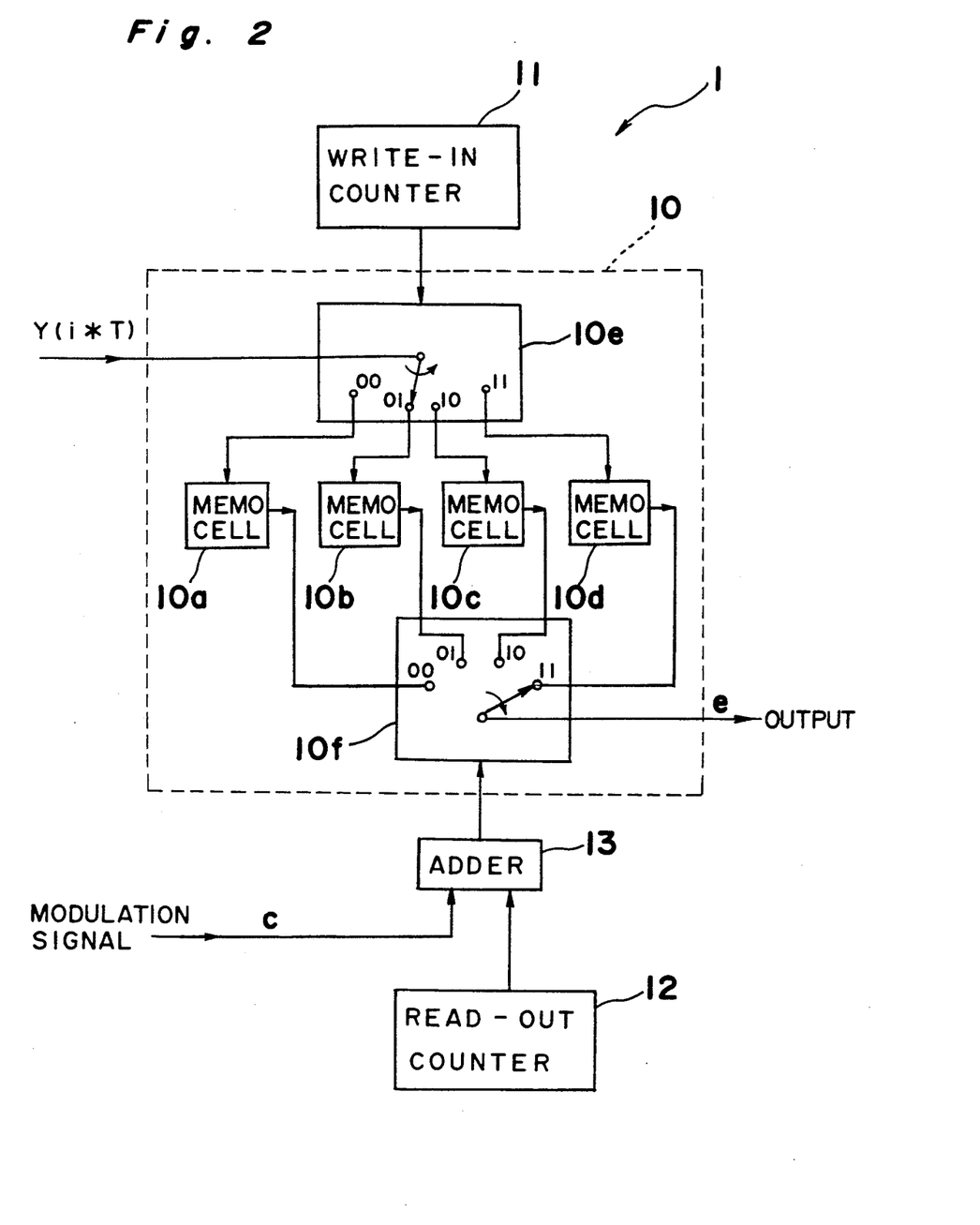
FIG. 2 is a block diagram showing constitution of a first preferred embodiment of the time axis modulation means of the present invention.

Referring to FIG. 2, the time modulation circuit 1 is diagrammatically shown which includes a memory circuit 10, a write-in counter 11, a read-out counter 12 and an adder 13.

The memory circuit 10 includes at least four memory cells 10a, 10b, 10c and 10d each having enough capacity to store one sampled pixel data. A write-switching circuit 10e is provided which has an arm for receiving the input signal $Y(i*T)$, in which T is a sampling cycle period and i is a number of occurrence of the sampling, and four output terminals indicated as 00, 01, 10 and 11. A read-switching circuit 10f is provided which has four input terminals indicated as 00, 01, 10 and 11 and an arm for producing a time modulated signal e. The arm of the write-switching circuit 10e is driven by the write-in counter 11, and the arm of the read-switching circuit 10f is driven by the adder 13 coupled to the read-out counter 12.

In operation, 2-bit write-in counter 11 sequentially produces drive signal 00, 01, 10, 11, 00, 01, 10, 11, . . . (repeat . . . , in a predetermined sampling frequency. Thus, the pixel data $Y(i*T)$ are sequentially supplied through terminals 00, 01, 10 and 11 in memory cells 10a, 10b, 10c and 10d, with the old pixel data in memory cells being overwritten by new pixel data. In the description hereinbelow, the memory cells 10a, 10b, 10c and 10d carrying one previous pixel data are indicated as 10a', 10b', 10c' and 10d', respectively. In this manner, four past pixel data sampled in four past sampling cycles are available in memory cells 10a, 10b, 10c and 10d.

In a synchronized relationship with the write-in counter 11, 2-bit read-out counter 12 sequentially produces drive signal 10, 11, 00, 01, 10, 11, 00, 01, . . . (repeat) . . . which is delayed by two sampling cycle periods with respect to the drive signal from the write-in counter.

When the modulation signal c is zero, the drive signal produced from adder 13 is identical to the signal produced from read-out counter 12, which is two sampling cycle periods behind. Thus, for example, at a time when the write-in drive signal is 01 for storing a pixel data in memory cell 10b, the read-out drive signal is 11 for reading a pixel data in memory cell 10d' which is stored two sampling cycle periods before. Thus, the read out pixel data d is delayed by two sampling cycle periods with respect to the original input pixel data Y(i*T), and is identical to the pixel data a.

Therefore, if the modulation signal c=0 continues, the drive signal from the adder 13, which is identical to that produced from read-out counter 12, causes sequential read out of the pixel data from the memory cells 10c', 10d', 10a and 10b. In the first embodiment, the output signal with the modulation signal c=0 is used as a reference signal, which is delayed by two sampling cycles with respect to the input signal Y(i*T).

When the modulation signal c is +1, the drive signal produced from adder 13 is advanced by one sampling cycle period. Thus, the read out pixel data e is advanced by one sampling cycle periods with respect to the reference signal.

When the modulation signal c is +2, the drive signal produced from adder 13 is advanced by two sampling cycle periods. Thus, the read out pixel data e is advanced by two sampling cycle periods with respect to the reference signal. In this case, the sampled and stored pixel data in the memory cells are immediately read out with out any substantial delay. Thus, the read out pixel data e is substantially a non-delayed and non-advanced pixel data with respect to the original input pixel data Y(i*T). There may be a very small delay due to the difference in the selection of an effective triggering edge, whether the leading or trailing edge of the driving pulse is used, between the write-switching circuit 10e and read-switching circuit 10f.

When the modulation signal c is −1, the drive signal produced from adder 13 is delayed by one sampling cycle period. Thus, the read out pixel data e is delayed by one sampling cycle period with respect to the reference signal.

When the modulation signal c is −2, the drive signal produced from adder 13 is delayed by two sampling cycle periods. Thus, the read out pixel data e is delayed by two sampling cycle periods with respect to the reference signal.

The above relationship is shown in Table 1 below.

TABLE 1

| Sampling time | t-1 | t0 | t1 | t2 | t3 | t4 | t5 | t6 |
|---|---|---|---|---|---|---|---|---|
| Write | 10a' | 10b' | 10c' | 10d' | 10a | 10b | 10c | 10d |
| Read (0) | 10c" | 10d" | 10a' | 10b' | 10c' | 10d' | 10a | 10b |
| Read (+1) | 10d" | 10a' | 10b' | 10c' | 10d' | 10a | 10b | 10c |
| Read (+2) | 10a' | 10b' | 10c' | 10d' | 10a | 10b | 10c | 10d |
| Read (−1) | 10b" | 10c" | 10d" | 10a' | 10b' | 10c' | 10d' | 10a |
| Read (−2) | 10a" | 10b" | 10c" | 10d" | 10a' | 10b' | 10c' | 10d' |

*The number in parentheses represents the modulation signal c.
*The prim ' indicates four previous sampling cyles, and " indicates further four previous sampling cycles.

Referring back to FIG. 1, the operation for making the modulation signal c is described. The delay circuit 2 is provided for counterbalancing the average delay in the time modulation circuit 1 and produces a signal a as shown in FIG. 3, in which t1, t2 . . . tn respectively designate the sampling times. In signal a, the rising and falling portions are the portion where the color changes, that is where the contour of the image is located.

The first differentiation circuit 3 differentiates signal a. The differentiation is accomplished by calculating a difference between two sampling data, and the obtained difference is divided by the sampling cycle period T. In other words, in the first differentiation circuit 3, the following calculation (1) is carried out.

$$Y'(i*T) = \{Y((i+1)*T) - Y(i*T)\}/T \quad (1)$$

wherein, Y(i*T) is the with sampled data, (i being a positive integer), and T is a sampling cycle period, Y((i+1)*T) is the (i+1)th sampled data, and Y'(i*T) is a derivative representing the partial differential of the signal.

The absolute value calculation circuit 4 takes an absolute of the signal from the first differentiation circuit 3 to produce signal b, as shown in FIG. 3.

The second differentiation circuit 5 differentiates signal b in a similar manner to the first differentiation circuit 3, and produces a second order differentiated signal which is inverted by invertor 6 to produce the modulation signal c.

When the signal a and c are compared, the modulation signal c takes a negative value both at times when signal a starts to rise and starts to fall (that is, at the first half portion of the contour of the image), and takes a positive value both at times when signal a reaches the rising end portion and the falling end portion (that is, at the latter part of the contour of the image). Therefore, signal c is used as a modulation signal for advancing (or expanding) and delaying (or compressing) the original input signal, as will be described in detail below.

In FIG. 3, signal d is equal to signal a, both are delayed by two sampling cycles. Signal d is obtained when the drive signal from the read-out counter 12 is used without any modification in adder 3, i.e., c=0, and shows a non-compressed non-expanded signal.

It is to be noted here that the sampling times t1, t2, t3, . . . shown in connection with signal d represent write-in sampling times effected by write-switching circuit 10e, and sampling times t1', t2', t3', . . . shown in connection with signal e represent read-out sampling times effected by read-switching circuit 10f.

At sampling time t1, since the time modulation signal is such that c=0, signal d is produced as it is from read-switching circuit 10f. In other words, pixel data "Read (0)" at time t1 in Table 1, which is 10a', is used.

At sampling time t2, since the time modulation signal is such that c=−1, signal di is delayed by one sampling cycle. Thus, pixel data "Read (−1)" at time t2 in Table 1, which is 10a', is used. Thus, at sampling time t2', the same pixel data as that used in the previous sampling time t1' is used again.

At sampling time t3, since the time modulation signal is such that c=−2, signal d is delayed by two sampling cycles. Thus, pixel data "Read (−2)" at time t3 in Table 1, which is 10a', is used at time t3'. Thus, at sampling time t3', the same pixel data as that used in the previous sampling time t1' is used again.

At sampling time t4, since the time modulation signal is such that c=−1, signal d is delayed by one sampling cycle. At this time, pixel data "Read (−1)" at time t4 in Table 1, which is 10c', is sued at time t4'.

By the above delay in the sampling times t1'-t4', the slow rising slope of signal d is changed to a rapid rising slope as in signal e.

At sampling time t5, since the time modulation signal is such that c=0, signal d is used as it is. Thus, pixel data "Read (0)" at time t5 in Table 1, which is 10a, is used.

At sampling time t6, since the time modulation signal is such that c=+1, signal d is advanced by one sampling cycle. Thus, pixel data "Read (+1)" at time t6 in Table 1, which is 10c, is used.

In a similar manner, at sampling time t7 and 58, signal d is advanced by two and one sampling cycles, respectively, so that the top flat portion of the signal d is widened as in signal e, and yet the slopes in signal d are made steep and the corners are made less rounded.

More specifically, at the rising of the signal d, the pixel data is read out with a delay during the first half of the rising corresponding to the first half of the contour of the color difference signal, and with an advance during the latter half of the rising corresponding to the latter half of the contour of the color difference signal. Thus, the rising slope of the signal inclines steeply in the contour corresponding to a region indicated by an arrow (S2), as shown in signal e. In other words, the contour portion of the color difference signal is compressed in the time domain, and the portions before and after the contour portion (indicated by arrows (S1) and (S3)) are extended in the time domain so as to counterbalance the effects of the compressed time.

Also in the falling period of the signal d after t10, since the delayed and advanced data are read out in accordance with the negative and positive values of the modulation signal c, the contour of the falling portion of the color difference signal is compressed in the time domain so as to have a steep inclination, and the portions before and after the contour portion are extended so as to counterbalance the compressed time. Thus, since the contour portion of the color difference signal has a steep slope without any over-shooting or pre-shooting, the contour portion can be reproduced without any color blurring, resulting in a high resolution.

Figure 4:
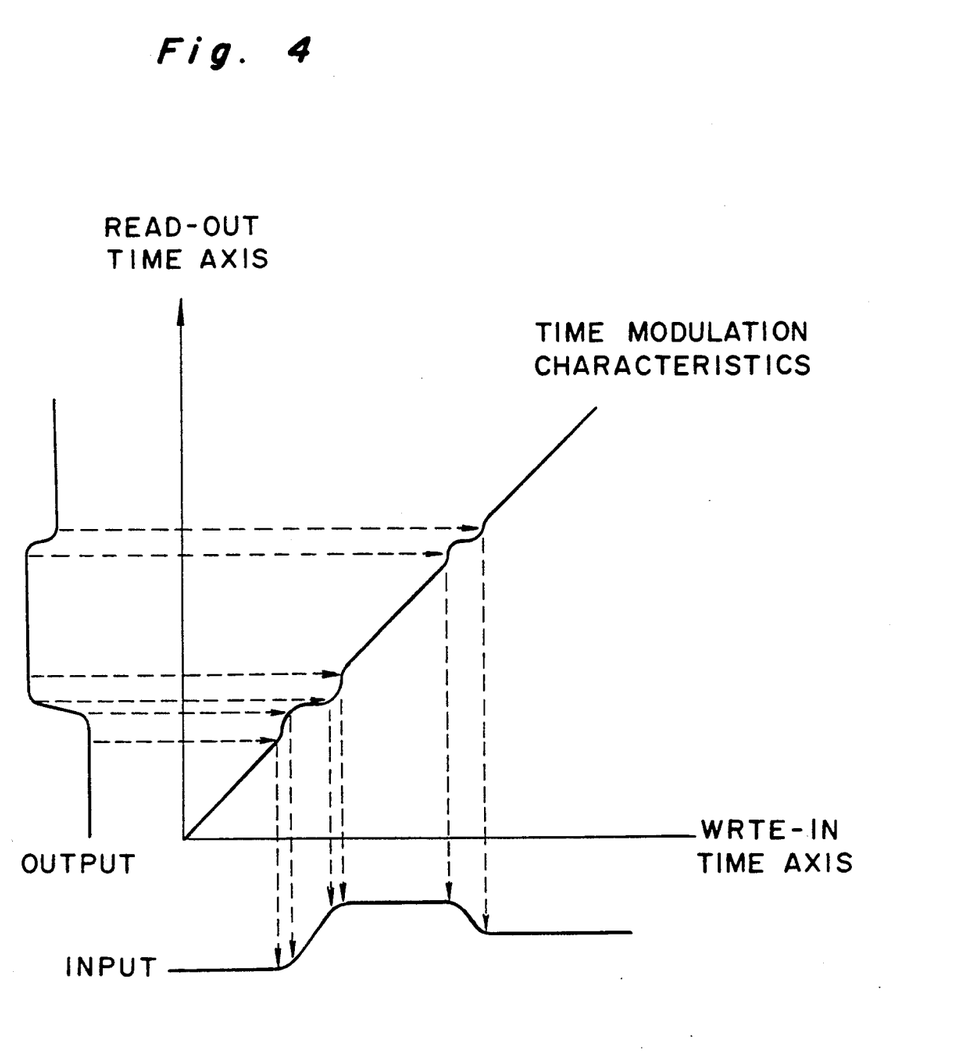
FIG. 4 is a diagram showing the time axis modulation characteristic.

In order to help the further understanding of the above-described time modulation operation, the modulation characteristic of the time modulation circuit 1 is shown in FIG. 4.

In the first embodiment, the reference signal is described as being delayed by two sampling cycles, but can be delayed more than two sampling cycles.

Figure 5:
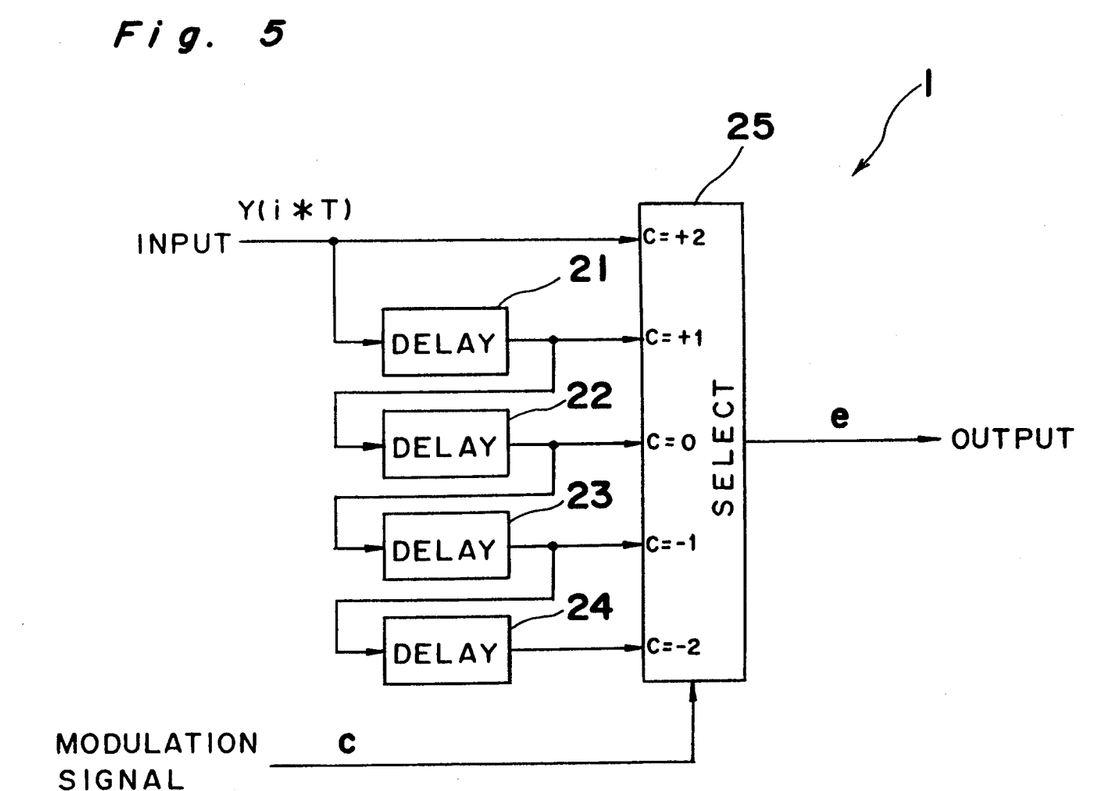
FIG. 5 is a block diagram showing constitution of a second preferred embodiment of the time axis modulation means of the present invention.

Referring to FIG. 5, a modification of the time modulation circuit 1 is shown, in which reference numerals 21, 22, 23, and 24 are respectively delay circuit, each for delaying an input signal by one sampling cycle period. The delay circuits 21, 22, 23 and 24 are connected in series as in a shift register. Reference numeral 25 is a selector for selecting and passing the input signal of respective outputs from delay circuit 21, 22, 23 and 24 in accordance with the modulation signal c.

In this arrangement, the signal obtained from delay circuit 22 is used as the reference signal and is outputted when the modulation signal is such that c=0. When the modulation signal c is +1 or +2, the signal from delay circuit 21 or the original signal is selected, respectively, to obtain a one or two cycle advanced signal. On the other hand, when the modulated signal c is −1 or −2, the signal from delay circuit 23 or 24 is selected, respectively, to obtain a one or two cycle delayed signal.

Figure 6:
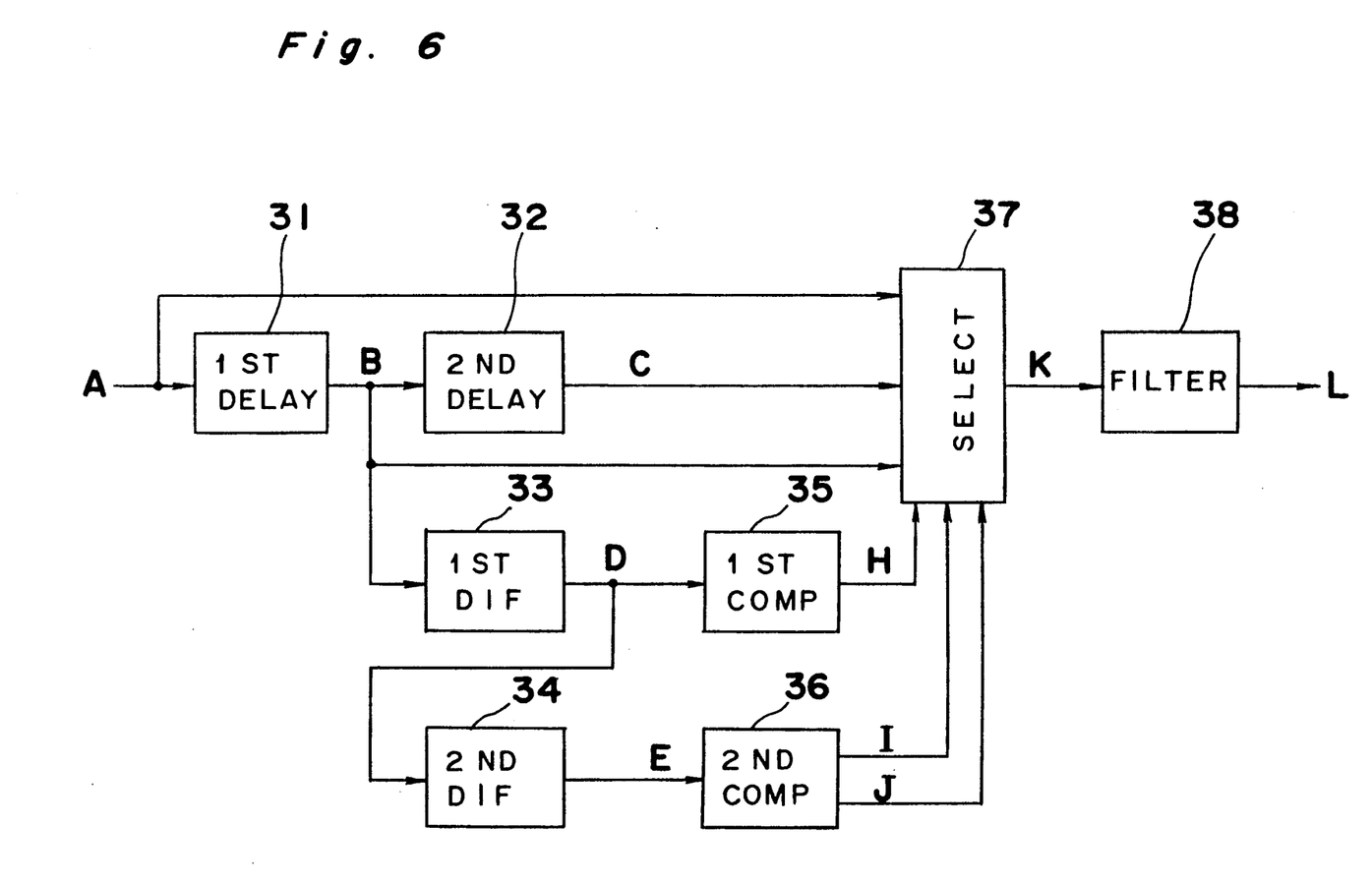
FIG. 6 is a block diagram showing constitution of an image signal processing device according to another preferred embodiment of the present invention.
Figure 7:
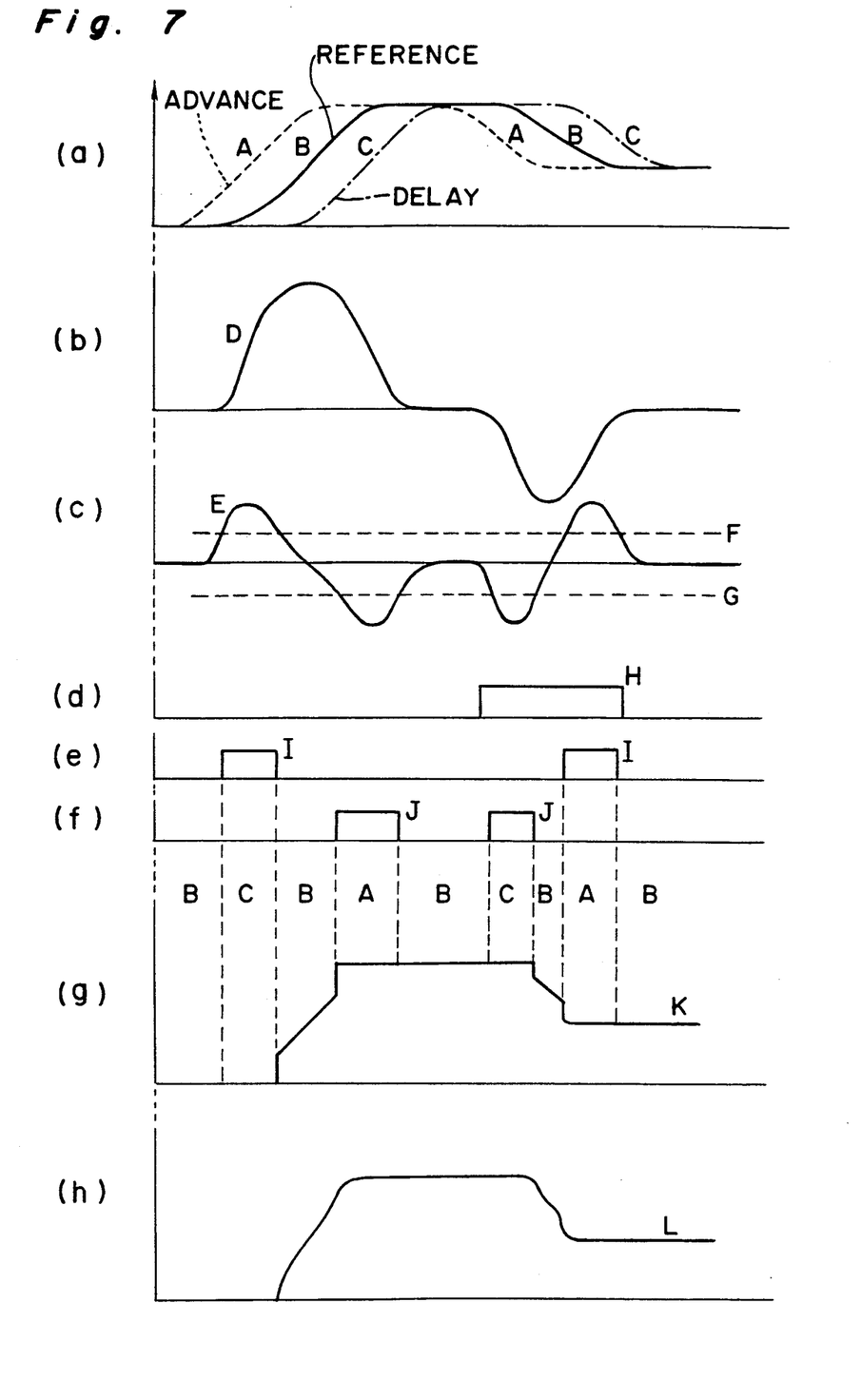
FIG. 7 is a waveform diagram of each portion for explaining the operation of the preferred embodiment of FIG. 6.

Referring to FIG. 6, an image contour enhancing device according to a second embodiment of the present invention is show, which is suitable for an analog processing system. In FIG. 6, first and second analog delay circuits 31 and 32 are formed by one-pixel data delay line for producing a one-pixel data delayed signal B and a two-pixel data delayed signal C. Thus, as shown in FIG. 7, the one-pixel data delayed signal B is sued as a reference signal, an original signal A is used as an advanced signal, and the two-pixel data delayed signal C is used as a delayed signal.

First and second differentiation circuits 33 and 34 are formed by resistors and capacitors. The first differentiation circuit 33 produces a first differentiated signal D and the second differentiated circuit 34 produces a second order differentiated signal E.

A first comparator 35 is provided for comparing the first differentiated signal D with a zero level and for producing a signal H when signal D is negative. A second comparator 36 is provided for comparing the differentiated signal E with positive and negative thresholds F and G, and produces a signal I when the signal E falls below the negative threshold G, and J when the same exceed above the positive threshold F.

A selector 37 is formed by analog switches for selectively passing the original signal A, one-pixel data delayed signal B or two-pixel data delayed signal C in accordance with the combination of signals H, I and J shown below in Table 2.

TABLE 2

| H | I | J | Signal Passed |
|---|---|---|---|
| 0 | 0 | 0 | B |
| 0 | 0 | 1 | A |
| 0 | 1 | 0 | C |
| 1 | 0 | 0 | B |
| 1 | 0 | 1 | C |
| 1 | 1 | 0 | A |

When the selector 37 is operated in accordance with Table 2, a signal K is produced, which is smoothed by a low pass filter 38 to obtain a signal L from which higher harmonics are removed.

According to the second embodiment of the present invention, an improvement of the resolution is achieved by steepening the slope of the contour portion of the input signal through a time modulation by using an analog processing. When a precise signal modulation is required, the two or more thresholds in positive and negative regions should be used.

Furthermore, although the preferred embodiment of FIG. 1 uses a digital processing, and the preferred embodiment of FIG. 6 uses an analog processing, the present invention is not limited to these above. For example, the operation in the embodiment of FIG. 6 may be effected by a digital processing. Furthermore, the operation in the first embodiment of FIG. 1 may be effected by an analog processing, in which case the time modulation may be effected by the use of a CCD delay line.

Furthermore, although the above preferred embodiments have been described in connection with the use of the color difference signal as an example, the present invention may be applicable to other signals, such as the brightness signal, RGB signal, the light and shade signal, etc.

As is clear from the foregoing description, since the present invention is adapted to improve the resolution by compressing the time axis of the contour portion so as to steepen the gradient thereof as compared with the conventional contour enhancing by amplifying the minute high band components included in the input signal, the present invention has an excellent effect. For example, the problem that the high band noise component is amplified and results in S/N ratio deterioration does not exist.

Furthermore, conventionally, it has been impossible to apply enhancing onto such a high band component that will not exist in the input signal, but according to the present invention, since the high band component in the input signal can be moved to a further higher band by the time modulation, it becomes possible to realize a contour steeper than conventionally.

In addition, since the gradient itself of the contour portion is steepened without adding preshoots and overshoots to the contour of the image signal, a natural contour enhancing is possible without unnatural color changes in the contour. Furthermore, since neither preshoots nor overshoots are present even when the time modulated signal is applied to an image printer or display device having a narrow dynamic range with respect the contrast, an effective contour enhancing can be effected without departing from the dynamic range.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An image contour enhancing device for enhancing contours in images in an image data formed by a plurality of pixel data, said image contour enhancing device comprising:

a first differentiation means for differentiating said image data to produces a first differentiation signal representing an image data portion corresponding to a contour;

an absolute value means for taking an absolute value of said first differential signal to produce an absolute value signal representing front and rear edges of said contour;

a second differentiation means for differentiating said absolute value signal to produce a time modulation signal representing first and second half portions in each of said front and rear edges of said contour; and a time modulation means for modulating in time domain said image data in response to said time modulation signal such that the first half portion in said front and rear edges of said contour is delayed a number of sampling periods determined by said time modulation signal, and the second half portion in said front and rear edges of said contour is advanced a number of sampling periods determined by said time modulation signal relative to a reference signal.

2. An image contour enhancing device as claimed in claim 1, wherein said time modulation means comprises: a plurality of delay circuits for delaying said image data serially in a plurality of stages and for producing a plurality of delayed outputs and a non-delayed output; and a selection means for receiving outputs from said delay circuits and for selecting one output in accordance with said time modulation signal.

3. An image contour enhancing device as claimed in claim 1, wherein said time modulation means comprises: a memory means having a plurality of cells for storing a plurality of pixel data of said image data; a write-in counter for producing a write-in address designating said cells for storing said pixel data sequentially in said cells; a read-out counter for producing a read-out address data; and an adding means for adding said read-out address data with said time modulation signal to produce a modified read-out address data designating said cells for reading said pixel data.

4. An image contour enhancing device for enhancing contours in images in an image data formed by a plurality of pixel data, said image contour enhancing device comprising:

a first differentiation means for differentiating said image data to produces a first differentiation signal representing an image data portion corresponding to a contour;

a first comparing means for detecting the polarity of said first differentiation signal;

a second differentiation means for differentiating said first differentiation signal to detect, with the use of detection result of said first comparing means, a time modulation signal representing first and second half portions in each of said front and rear edges of said contour; a second comparison means for comparing the output of said second differentiation means with a positive threshold and a negative threshold;

a delay means for delaying said image data serially in a plurality of stages and for producing a plurality of delayed outputs and a non-delayed output; and a selection means for receiving outputs from said delay circuits and for selecting one output in accordance with said outputs from said first and second comparison means.

* * * * *